United States Patent
Fredriksson

(10) Patent No.: US 9,291,492 B2
(45) Date of Patent: Mar. 22, 2016

(54) TANK FEED THROUGH STRUCTURE FOR A RADAR LEVEL GAUGE

(71) Applicant: Rosemount Tank Radar AB, Gothenburg (SE)

(72) Inventor: Hakan Fredriksson, Linkoping (SE)

(73) Assignee: Rosemount Tank Radar AB, Gothenburg (SE)

(*) Notice: Subject to any disclaimer, the term of this patent is extended or adjusted under 35 U.S.C. 154(b) by 293 days.

(21) Appl. No.: 13/796,105

(22) Filed: Mar. 12, 2013

(65) Prior Publication Data

US 2014/0266864 A1 Sep. 18, 2014

(51) Int. Cl.
*G01F 23/284* (2006.01)
*G01S 13/88* (2006.01)

(52) U.S. Cl.
CPC .............. *G01F 23/284* (2013.01); *G01S 13/88* (2013.01); *Y10T 29/49947* (2015.01)

(58) Field of Classification Search
CPC ..................................................... G01F 23/284
USPC ......................................................... 342/124
See application file for complete search history.

(56) References Cited

U.S. PATENT DOCUMENTS

| | | | | |
|---|---|---|---|---|
| 5,703,289 A * | 12/1997 | Mulrooney | ................ | 73/290 V |
| 5,872,494 A | 2/1999 | Palan et al. | | |
| 5,877,663 A * | 3/1999 | Palan et al. | ................... | 333/252 |
| 5,955,684 A * | 9/1999 | Gravel et al. | ................ | 73/866.5 |
| 5,992,251 A * | 11/1999 | Grieger et al. | ............... | 73/866.5 |
| 6,011,400 A | 1/2000 | Nicolas | | |
| 6,019,007 A * | 2/2000 | Grieger et al. | ............... | 73/866.5 |
| 6,118,282 A * | 9/2000 | Grieger | ........................ | 324/637 |
| 6,148,681 A * | 11/2000 | Gravel et al. | ................ | 73/866.5 |
| 6,178,817 B1 * | 1/2001 | Hewelt et al. | ............... | 73/290 V |
| 6,325,391 B1 * | 12/2001 | Smith et al. | .................... | 277/650 |
| 6,386,055 B1 * | 5/2002 | Eason | .......................... | 73/866.5 |
| 6,700,530 B1 * | 3/2004 | Nilsson | ......................... | 342/124 |
| 6,820,510 B2 * | 11/2004 | Schroth et al. | ............... | 73/866.5 |

(Continued)

FOREIGN PATENT DOCUMENTS

| EP | 2098838 A1 * | 9/2009 | ............. | G01F 23/28 |
|---|---|---|---|---|
| EP | 2 490 040 A1 | 8/2012 | | |

(Continued)

OTHER PUBLICATIONS

Notification of Transmittal of the International Search Report and the Written Opinion of the International Searching Authority from PCT/EP2014/054747, dated Jul. 10, 2014.

(Continued)

*Primary Examiner* — Matthew M Barker
(74) *Attorney, Agent, or Firm* — Westman, Champlin & Koehler, P.A.

(57) ABSTRACT

A radar level gauge using electromagnetic waves for determining a filling level of a product in a tank, comprising a transceiver, processing circuitry, a signal propagating device and a tank feed through structure. The tank feed through structure includes a fixed tank connection arranged to be secured to the tank, a tank connection adaptor arranged in a through hole of the fixed tank connection, a coupling arrangement arranged in the through hole and resting against the tank connection adaptor, and a fastening member attached to the fixed tank connection and securing the coupling arrangement between the tank connection adaptor and the fastening member.

12 Claims, 10 Drawing Sheets

(56) References Cited

U.S. PATENT DOCUMENTS

| | | | |
|---|---|---|---|
| 6,927,734 B2* | 8/2005 | Serban et al. | 343/703 |
| 7,204,140 B2* | 4/2007 | Kallsand et al. | 73/290 R |
| 7,255,002 B2* | 8/2007 | Gravel et al. | 73/290 V |
| 7,328,611 B2* | 2/2008 | Klees et al. | 73/290 V |
| 7,401,511 B2 | 7/2008 | Dietmeier | |
| 7,406,865 B2* | 8/2008 | Klees et al. | 73/304 R |
| 7,450,055 B2* | 11/2008 | Eriksson | 342/124 |
| 7,515,095 B2* | 4/2009 | Wilkie et al. | 342/124 |
| 7,675,473 B2* | 3/2010 | Kienzle et al. | 343/840 |
| 7,804,446 B2 | 9/2010 | Kienzle et al. | |
| 7,814,789 B2* | 10/2010 | Schroth | 73/304 C |
| 8,196,465 B2* | 6/2012 | Reimelt et al. | 73/290 V |
| 8,365,592 B2* | 2/2013 | Osswald | 73/290 R |
| 2001/0047685 A1 | 12/2001 | Lubbers | |
| 2002/0124644 A1 | 9/2002 | Lubbers | |
| 2010/0109963 A1 | 5/2010 | Kienzle et al. | |
| 2014/0103950 A1* | 4/2014 | Janitch | 324/754.06 |
| 2014/0125512 A1* | 5/2014 | Janitch | 342/124 |

FOREIGN PATENT DOCUMENTS

| | | |
|---|---|---|
| GB | 2 350 004 A | 2/2000 |
| WO | WO 98/14762 | 4/1998 |
| WO | WO 2007/097690 | 8/2007 |

OTHER PUBLICATIONS

Notification of Transmittal of the International Search Report and the Written Opinion of the International Searching Authority from PCT/EP2014/054744, dated Jun. 16, 2014.

* cited by examiner

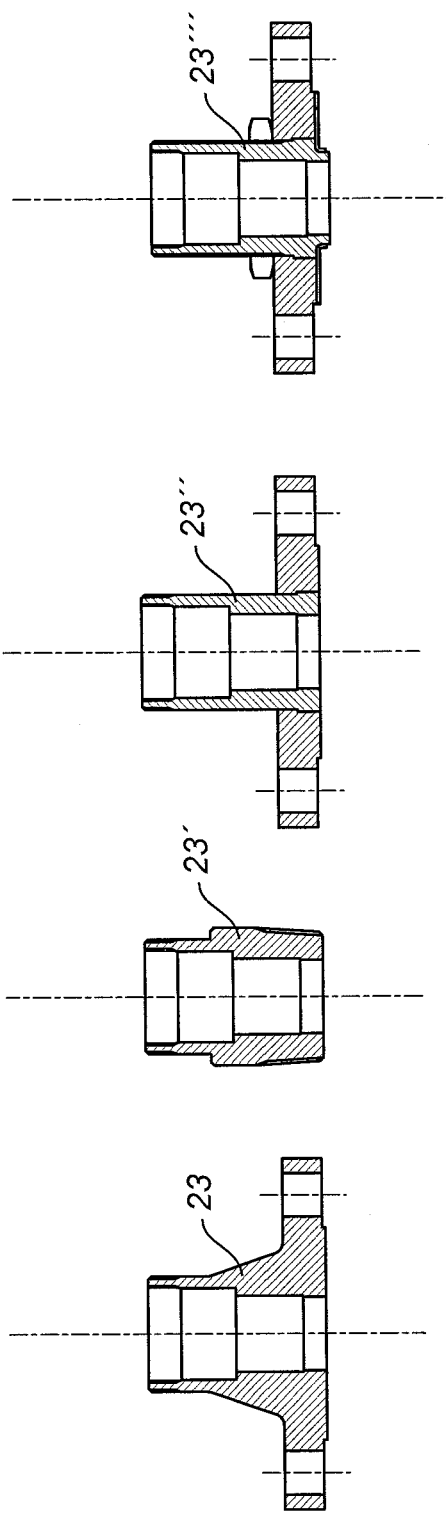

TANK FEED THROUGH STRUCTURE FOR A RADAR LEVEL GAUGE

FIELD OF THE INVENTION

The present invention relates to a tank feed through structure for a radar level gauge.

BACKGROUND OF THE INVENTION

Radar level gauges (RLGs) are suitably used for making measurements of the level of products such as process fluids, granular compounds and other materials contained in a tank. An example of such a radar level gauge can include a transceiver for transmitting and receiving microwaves, a signal propagating device arranged to direct microwaves towards the surface and to return microwaves reflected by the surface to the transceiver, and processing circuitry adapted to determine the filling level based on a relation between microwaves transmitted and received by the transceiver.

The signal propagating device may be a directional antenna, adapted to emit free propagating electromagnetic waves into the tank and receive a reflection of those waves. Such an RLG is sometimes referred to as a non-contact RLG. The antenna may be adapted to a specific frequency band, and the currently most used frequency bands have center frequencies of 6 GHz and 24 GHz. Obviously, antennas adapted for such widely separated frequency bands will be structurally different, and require different wave guide matching.

Alternatively, the signal propagating device may be a probe extending into the product in the tank. The emitted signals are guided by the probe, and the RLG is often referred to as a guided wave radar (GWR) level gauge. There are several different types of probes, each adapted for specific center frequencies and with different structural features.

The radar level gauge will have to be adapted to the type and design of signal propagating device. More specifically, the tank feed though structure, which is securely fitted to the tank flange, and acts as an interface between the tank and the radar level gauge, will need to be specifically adapted to the signal propagating device. Of course, the tank feed through structure will also need to be specifically adapted to the size and type of the tank flange. This leads to a great number of individual parts that need to be manufactured and stored by suppliers of radar level gauges. This, in turn, leads to inefficient logistics and manufacturing economy.

GENERAL DISCLOSURE OF THE INVENTION

It is an object of the present invention to mitigate these problems and provide a radar level gauge which can be used with a wide variety of different signal propagating devices for any given tank flange.

According to a first aspect of the invention, this and other objects are achieved by a radar level gauge comprising a transceiver for transmitting an electromagnetic transmit signal and receiving an electromagnetic echo signal, processing circuitry connected to the transceiver for determining the filling level based on the electromagnetic echo signal, a signal propagating device for directing the electromagnetic transmit signal towards a surface of the product and to return a reflection from the surface as the electromagnetic echo signal, and a tank feed through structure. The tank feed through structure includes a fixed tank connection arranged to be secured to the tank, the fixed part having a through hole with an abutment surface, and a tank connection adaptor arranged in the through hole in abutment with the abutment surface, a coupling arrangement arranged in the through hole and resting against the tank connection adaptor, the coupling arrangement providing electromagnetic coupling between the transceiver and the signal propagating device through the feed through structure, and a fastening member attached to the fixed tank connection and securing the coupling arrangement between the tank connection adaptor and the fastening member.

According to this design, different tank connection adaptors may be adapted to fit a fixed tank connection having identical design. This reduces the required number of unique components significantly. For example, in order to enable mounting of four different types of signal propagating devices to four different tank connections, the present invention reduces the number of required components from 16 to 8.

In case of a radar level gauge, i.e. a level gauge operating with high frequency electromagnetic signals, the tank connection adaptor, which surrounds the coupling arrangement, is preferably made of an electrically conducing material, such as metal. Also the fixed tank connection may be made of the same material as the adaptor, so that the fixed tank connection and the tank connection adaptor together form an integrated tank connection.

The coupling arrangement may comprise an electrically conducting signal transmission member extending through a dielectric sleeve. The signal propagating device can then comprise a transmission line probe connected to the signal transmission member. With this design, the tank connection adaptor acts as the outer conductor of a coaxial line, and the signal transmission member acts as the central conductor.

Alternatively, the tank connection adaptor may form part of a hollow wave guide connecting the transceiver and the signal propagation device. Also the fixed tank connection may form part of the wave guide. The hollow wave guide may optionally be filled with a dielectric filling member, in order to provide sealing of the tank.

Additional sealing members may be required, especially under high pressure conditions, to form a process seal of the tank. The coupling arrangement may therefore include at least one sealing member.

According to a second aspect of the invention, there is provided a method for mounting a tank feed through structure of a radar level gauge in a flange in a roof of a tank. The method comprises securing a fixed tank connection in the flange, the fixed tank connection having a through hole with an abutment surface, inserting a tank connection adaptor in the through hole in abutment with the abutment surface, arranging a coupling arrangement in the through hole, and attaching a fastening member to the fixed tank connection, thereby securing the coupling arrangement between the tank connection adaptor and the fastening member.

It is noted that the order of the steps may deviate from the order listed here. In particular, the tank connection adaptor and coupling arrangement may be secured in the fixed tank connection before the fixed tank connection is mounted to the flange of the tank.

A signal propagating device may be connected to the tank connection adaptor or to the coupling arrangement. Again, this may be done before or after the tank connection is mounted to the tank.

BRIEF DESCRIPTION OF THE DRAWINGS

The present invention will be described in more detail with reference to the appended drawings, showing currently preferred embodiments of the invention.

FIG. 6 shows different examples of tank connections.

DETAILED DESCRIPTION OF PREFERRED EMBODIMENTS

Figure 1:
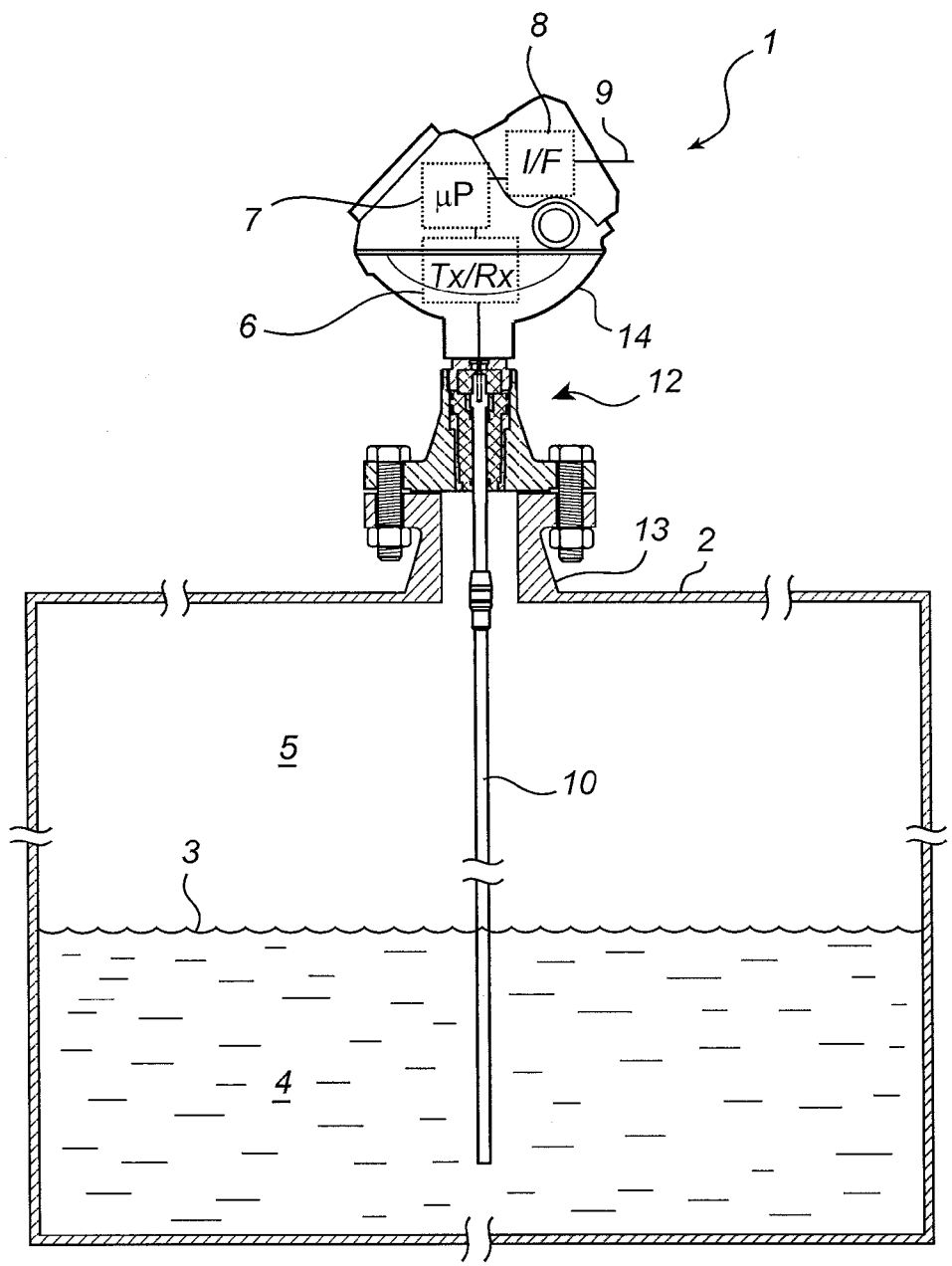
FIG. 1 is a schematic view of a radar level gauge mounted on a tank.

FIG. 1 shows a schematic drawing of a radar level gauge (RLG) 1 according to an embodiment of the present invention. The RLG 1 is mounted on a tank 2, and arranged to perform measurements of a process variable such as the level L of an interface 3 between two materials 4, 5 in the tank 2. Typically, the first material is a liquid 4 stored in the tank, e.g. gasoline, while the second material is air or other atmosphere 5 in the tank. In some applications, the tank is a very large metal tank (diameter in the order of 10 m).

The radar level gauge 1 includes transceiver circuitry 6, processing circuitry 7 and a signal and power interface 8, all enclosed in a housing 14. The transceiver circuitry 6 is electrically connected to a signal propagating device 10 extending into the tank 2. The signal propagating device 10 is arranged to act as an adapter, transmitting electromagnetic waves into the tank 2 to be reflected by the interface, here the surface 3 of the product 4 in the tank 2.

The signal propagating device 10 can be a guided wave transmission line as illustrated in FIG. 1. Such a transmission line can be a flexible wire suspended between top and bottom of the tank, or can be a rigid probe extending into the tank. It can be a single wire, twin wire, coaxial, or any other type of suitable transmission line. Alternatively, the signal propagating device is a free propagating antenna (not shown in FIG. 1), arranged in the top of the tank. In this case, the transmitted signal must be a microwave signal, e.g. a modulated pulse.

The RLG 1 further comprises a tank feed through structure 12, adapted to provide a preferably pressure sealed passage for electromagnetic signals through the wall of the tank, thereby allowing transmission of transmit signals and return signals between the transceiver circuitry 6 and the signal propagating device 10. The tank feed through structure 12 is fixedly mounted to a tank flange 13, and the signal propagating device 10 and the housing 14 are mechanically secured to the tank feed through structure 12. Various embodiments of the tank feed through structure 12 will be discussed in the following, with reference to FIGS. 2-5.

FIGS. 2-3 show embodiments suitable for guided wave radar (GWR) signal propagating devices. In these embodiments, the tank feed through structure comprises some kind of electrically conducting signal transmission member extending through the feed through structure. FIGS. 4-5 show embodiments suitable for non-contact (NC) signal propagating devices. In these embodiments, instead of a conducting transmission member, the tank feed through structure here comprises a central wave guide, filled with a dielectric member.

Figure 2A:
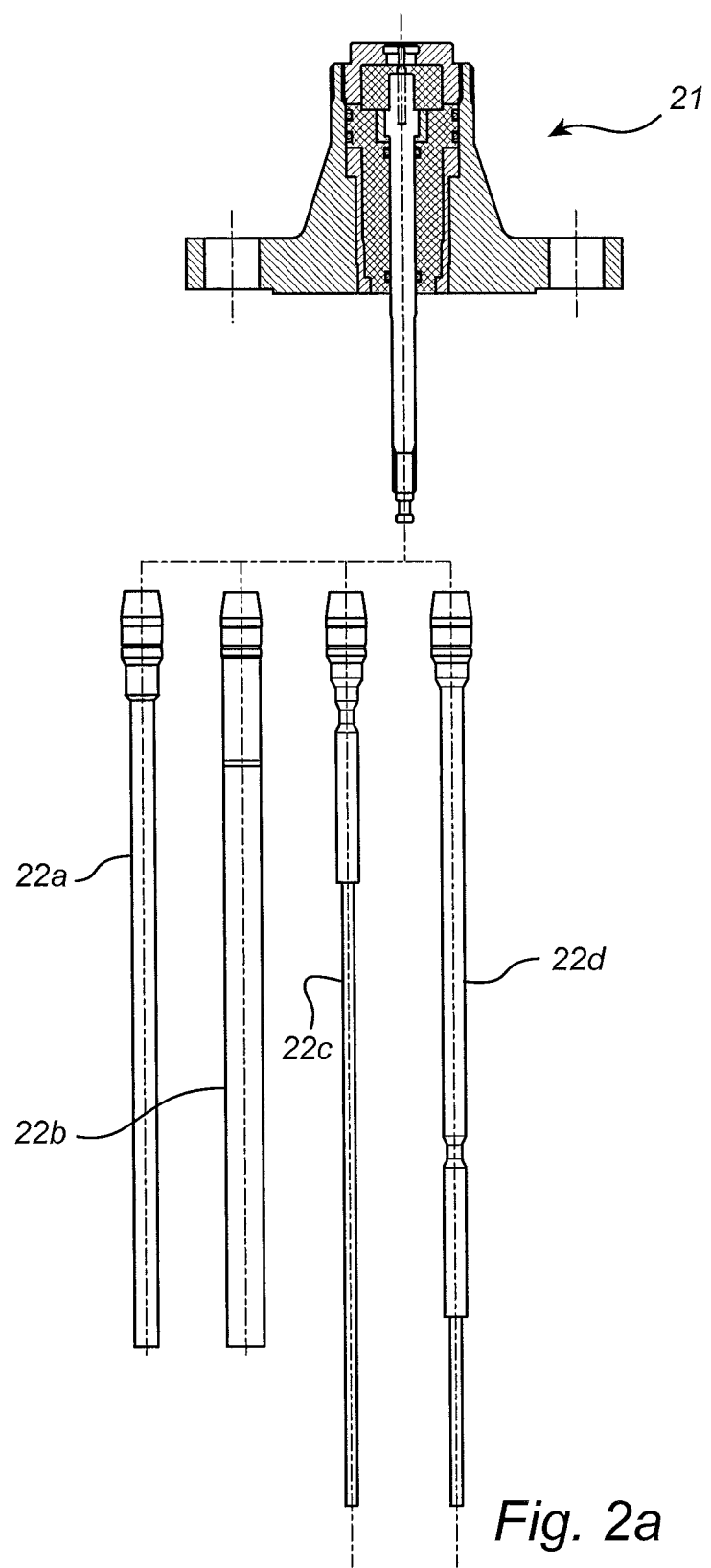
FIG. 2 a-b show a tank feed through structure according to a first embodiment of the invention.
Figure 2B:
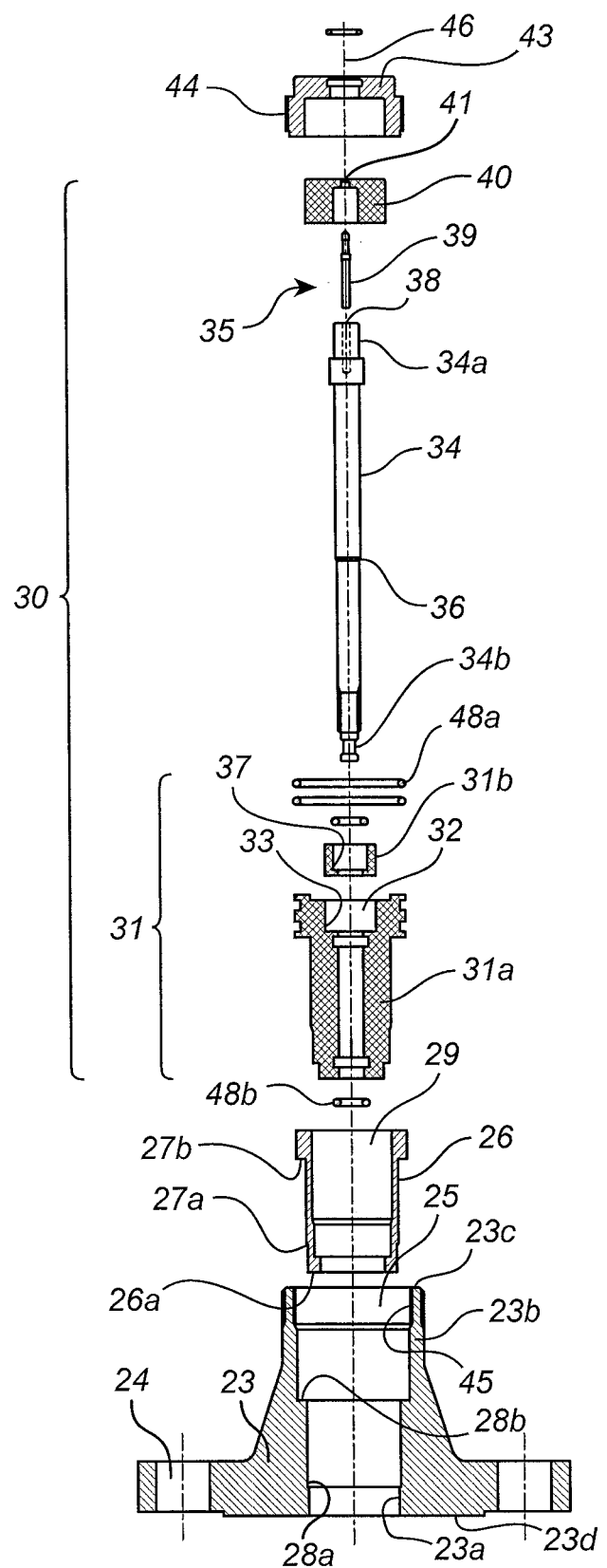

FIG. 2a-2b show a tank feed through structure 21 adapted for connection to a single wire transmission probe 22a-d. FIG. 2a shows four different types of probes 22a-d, suitable for various conditions. Probes 22a, b are rigid probes, 8 mm and 13 mm, respectively. Probes 22c, d are flexible probes of different types. With reference primarily to FIG. 2b, the feed-through structure comprises a fixed tank connection 23 made of a metal material, typically steel, which is adapted to be securely fitted to the tank flange 13 (see FIG. 1). For this purpose the fixed tank connection may have holes 24 for bolts or other fasteners (not shown). Alternatively, it may be adapted to be welded to the tank flange.

The fixed tank connection 23 further has an opening 25 in which there is arranged an essentially cylindrical tank connection adaptor 26. The adaptor 26 is suspended by the tank connection 23, here by means of annular protrusions 27a, 27b of the adaptor 26 which rest against annular abutments 28a, 28b in the opening 25. It may be sufficient with one annular abutment. Alternatively, the opening may be conically tapered, and the adaptor then has a matching shape. The fixed tank connection 23 and the adaptor 26 form an integrated structure. Optionally, the adaptor 26 is press fitted or otherwise secured in the opening 25.

The tank connection 23 and the adaptor 26 form an integrated structure, having an opening 29 extending from the interior of the tank 2 to the exterior. In the illustrated case, the adaptor 26 is suspended in a lower (interior facing) portion 23a of the fixed tank connection, so that an upper (exterior facing) portion of the opening 29 is formed by an upper portion of the opening 25 of the tank connection 23 extending above the adaptor 26. The adaptor 26 may alternatively be flush with the upper surface 23c of the tank connection structure, or even extend above the surface 23c. In the illustrated example, the bottom surface 26a of the adaptor 26 is flush with the bottom surface 23d of the tank connection 23.

In the opening 29 there is arranged a coupling arrangement 30, which is adapted to provide electromagnetic coupling between the circuitry 6 and the probe 22a-d. The coupling arrangement 30 here comprises a dielectric sleeve 31, typically made of a relatively soft dielectric material, such as PTFE. The sleeve 31 is suspended by the adaptor 26 and defines a channel 32 extending through the adaptor 26. In this channel 32 there is arranged a transmission member 34 of an electrically conducting material, such as copper.

The transmission member 34 has an exterior 34a end provided with a terminal 35 for connection to the transceiver circuitry 6, and an interior end 34b adapted for connection with the probe 22a-d. In the illustrated case, the transmission member 34 is an essentially cylindrical element having a protruding girdle 36 which rests against an annular abutment 37 in the upper end of the channel 32, thereby suspending the transmission member 34 so that the interior end 34b extends below the end of the adaptor 26. The terminal 35 is here formed by a bore 38 for receiving a contact pin 39, preferably made of copper or similar material.

The coupling arrangement further comprises a dielectric lid 40, which is arranged on top of the sleeve 31 so as to form a dielectric enclosure enclosing the transmission member 34. The lid 40 has a central opening 41 through which the contact pin 39 extends.

It is noted that the girdle 36 and annular abutment 37 cannot be too accentuated, as this would cause a disturbance of the microwave signals transmitted by the transmission member 34. In situations when the transmission member 34 is subjected to significant loads and/or the temperature of the tank feed through structure 21 (and thus the sleeve 31) is elevated, the transmission member 34 may therefore be forced to slide past the abutment 36. In the illustrated case, the sleeve 31 therefore includes an outer piece 31a, arranged to rest against the adaptor 26, and an inner piece 31b arranged inside the outer piece 31a and forming the upper portion of the channel 32. This allows the inner piece 31b to be made of a structurally stronger dielectric material, such as ceramics, so as to provide a firm abutment 37 for the transmission member 34, which abutment 37 is less soft and less affected by elevated temperatures compared to e.g. PTFE. If the materials of the inner and outer pieces 31*a*, 31*b* are matched, the abutment 33 against which the inner piece 31*b* rests can be made sufficiently large without causing any disturbances.

The tank feed through structure 21 in FIG. 2*b* further comprises a metal fastening member 43, arranged to be secured to the tank connection 23 such that the coupling arrangement 30 is sandwiched there between. In the illustrated case, the fastening member 43 is a steel cap, having an outer threading 44. The inside of the upper portion of the tank connection 23 has a corresponding threading 45, so that the cap 43 can be securely threaded in place. The steel cap 43 has a central opening 46 through which the contact pin 39 extends.

The coupling arrangement 30 may be arranged to provide a process seal, i.e. a seal preventing tank atmosphere potentially including product in gas form from leaving the tank. This may, for example, be accomplished by a plurality of sealing elements, such as o-rings 48*a-c*, included in the coupling arrangement. In the illustrated example, two o-rings 48*a* are provided between the sleeve 31 and the tank connection 23, and two o-rings 48*b* are provided between the dielectric sleeve 31 and the transmission member 34.

Figure 3A:
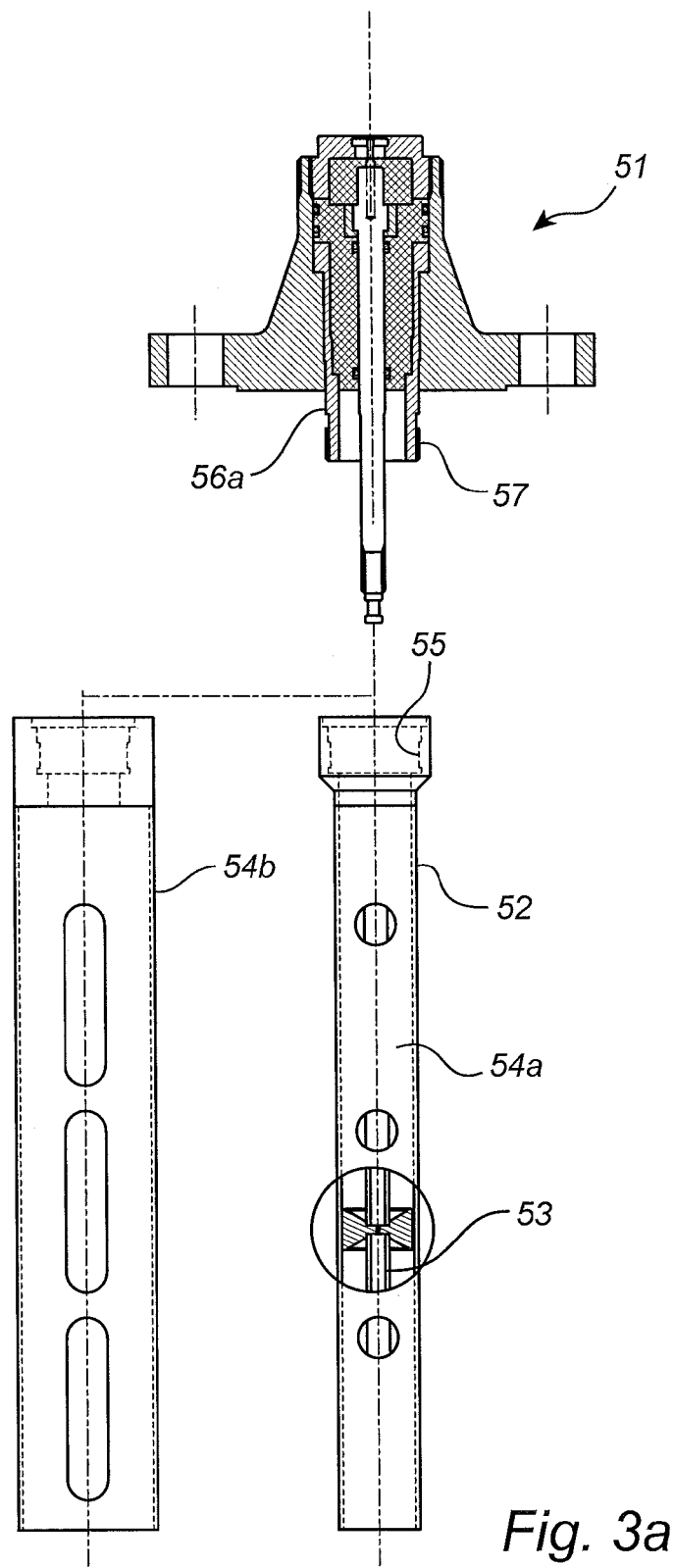
FIG. 3 a-b show a tank feed through structure according to a second embodiment of the invention.

FIG. 3*a-*3*b* shows another example of a tank feed through structure 51, here adapted to be connected to a coaxial probe 52. The coaxial probe 52 includes a central conductor 53 enclosed by a hollow structure 54*a*, optionally with openings to allow contents in the tank to pass freely through the structure. The probe 52 may have different diameter depending on the application, and to the left is illustrated a hollow structure 54*b* with greater diameter, also referred to as a still pipe. The central conductor may be a single line probe similar to those illustrated in FIG. 2*a*. The single line 53 may be an 8 mm probe, while a 13 m probe may be more suitable for the hollow structure 54*b*.

Figure 3B:
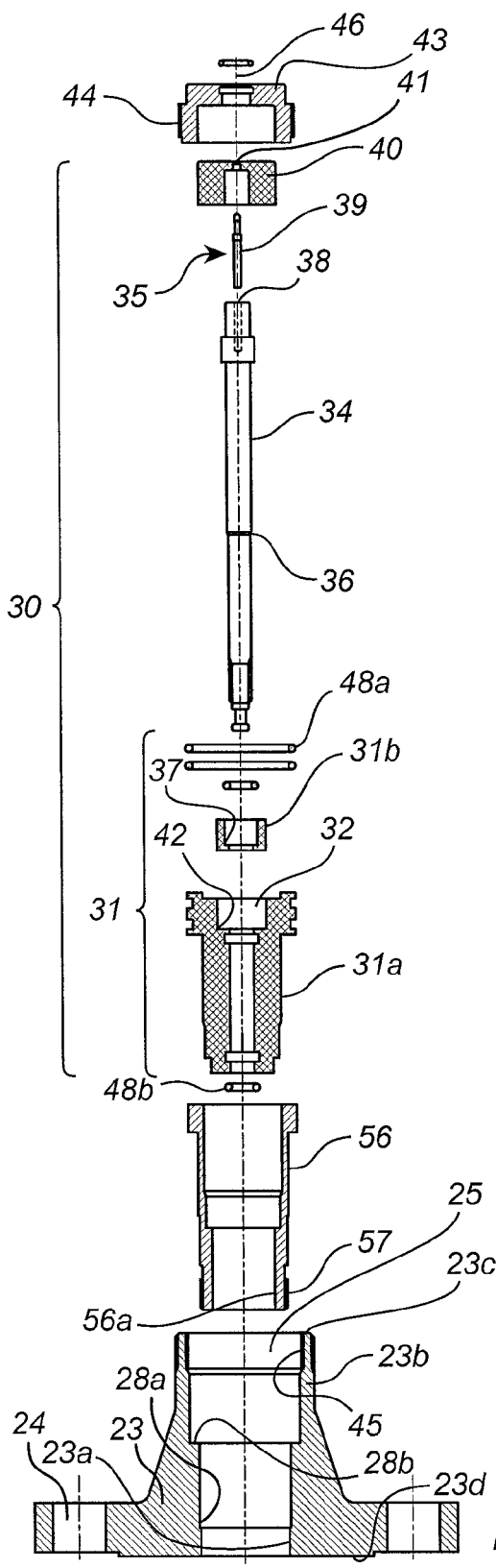

Most of the components of the tank feed-through structure in FIG. 3*a-b* are very similar to corresponding elements in FIG. 2*a-b*, and have been denoted with identical reference numerals. These components will not be described in further detail.

Just like in FIGS. 2 and 3, a tank connection adaptor 56 is suspended by the tank connection 23. Compared to the tank connector adaptor 26 in FIG. 2*a-b*, the tank connection adaptor 56 in FIG. 3*a-b* has a greater extension in its axial direction, i.e. in a direction normal to the tank wall.

With reference to FIG. 3*a*, showing the tank feed through structure 51 in assembled state, the lower portion 56*a* of the adaptor 56 therefore extends below the bottom surface 23*d* of the tank connection 23. The outer surface of this lower portion 56*a* is provided with a threading 57. The hollow structure 54*a*, 45*b* of the coaxial probe 52 has a corresponding inner thread 55, so that the structure 53 can be attached to the tank feed through structure 51.

FIG. 4-5 show examples of tank feed through structures adapted for connection to a directional antenna such as an antenna horn. The tank feed through structures therefore define wave guides extending from the antenna horn, through the tank wall, and to the upper portion of the tank feed through structure. The circuitry 6 is connected to the upper part of the wave guide by means of a suitable feeding arrangement, such as a feeding probe (not shown).

Figure 4A:
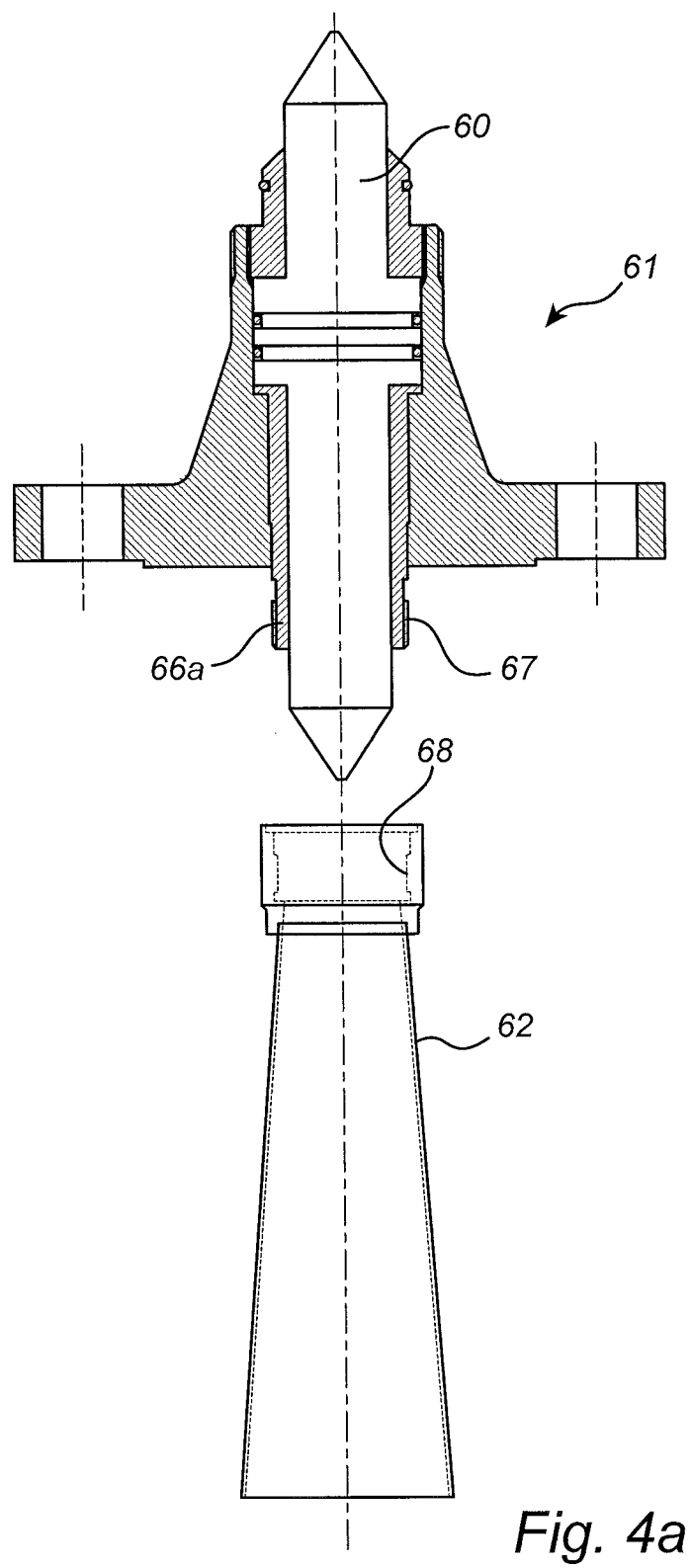
FIG. 4 a-b show a tank feed through structure according to a third embodiment of the invention.

The feed through structure 61 and antenna horn 62 in FIG. 4*a-*4*b* is designed for an operating frequency of around 6 GHz. A hollow wave waveguide 60 is defined by the tank feed through structure and typically filled with a dielectric material. In the illustrated case, with a filling member of PTFE, the hollow wave guide 60 has a diameter in the order of 25 mm.

Figure 4B:
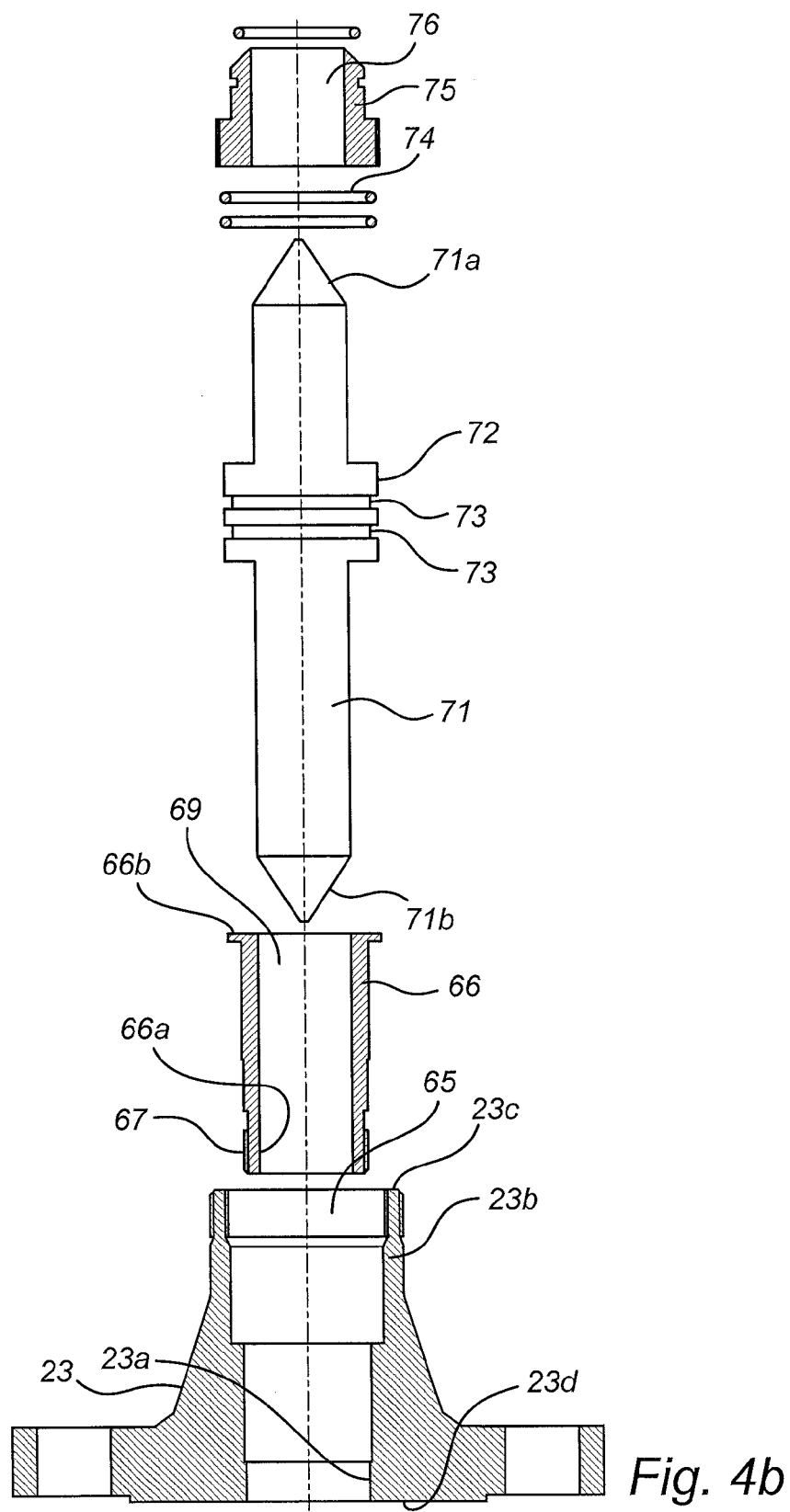

With reference primarily to FIG. 4*b*, the feed through structure 61 comprises a fixed tank connection 23, here identical to the tank connection 23 in FIGS. 2 and 3. In the opening 65 is fitted an essentially cylindrical tank connection adaptor 66. Just like in FIGS. 2 and 3, the adaptor 66 is suspended by the tank connection 23, so that the tank connection 23 and the adaptor 66 form an integrated structure.

In the illustrated case, the adaptor 66 is suspended in a lower (tank side) portion 23*a* of the fixed tank connection 23, so that an upper (exterior side) portion 23*b* of the tank connection 23 extends above the adaptor 66. The adaptor 66 may alternatively be flush with the upper surface 23*c* of the tank connection structure, or even extend above the surface 23*c*. Further, in the illustrated example, the lower (tank side) portion 66*a* of the adaptor 66 extends beyond the bottom surface 23*d* of the tank connection 23. A threading 67 is here formed on the peripheral surface of the lower portion 66*a*, and the antenna horn 62 has a corresponding threading 68 to enable easy mounting of the antenna horn to the tank connection adaptor.

The adaptor 66 has a channel 69 which forms a lower portion of the wave guide 60. In the channel 69 there is arranged a coupling arrangement, here in the form of a dielectric wave guide filling element 71, typically made of a relatively soft dielectric material, such as PTFE. The member 71 has a substantially cylindrical shape, with tapered ends 71*a*, 71*b*, and has a girdle portion 72 having a larger diameter. The girdle 72 rests against an upper flange 66*b* of the adaptor 66. The girdle further has two annular grooves 73 around its peripheral surface, adapted to receive sealing elements such as o-rings 74. The tapered lower end 71*b* extends beyond the lower portion 66*a* of the adaptor 66, and into the antenna horn 62.

On top of the filling element 71 is fitted a substantially cylindrical metal fastening member 75, having an inner channel 76 forming the upper portion of the wave guide 60. The diameters of channels 69 and 76 are here identical, but may optionally be different to provide suitable matching. The filling element 71 is thus sandwiched between the adaptor 66 and fastening member 75, which together form the hollow wave guide 60.

Figure 5A:
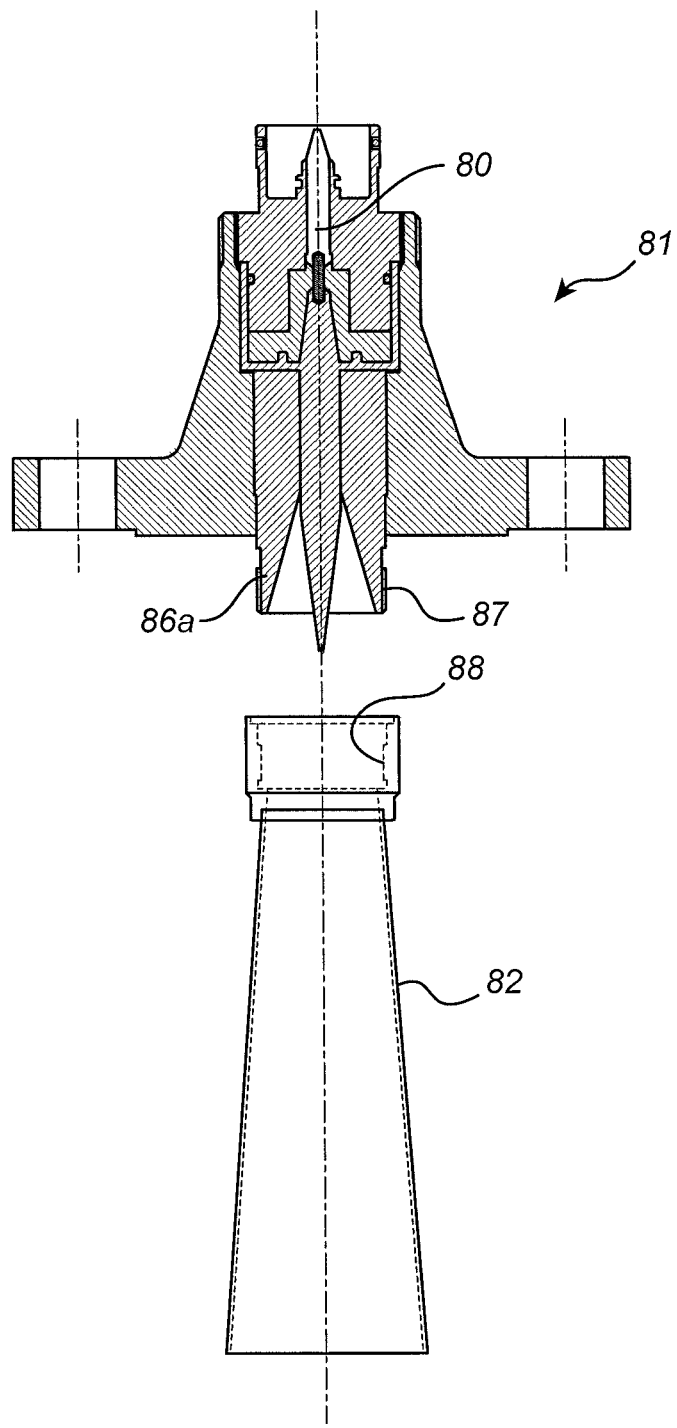
FIG. 5 a-b show a tank feed through structure according to a fourth embodiment of the invention.

The feed through structure 81 and antenna horn 82 in FIGS. 5*a-*5*b* is designed for an operating frequency of around 26 GHz. A hollow wave waveguide 80 is defined by the tank feed through structure and typically filled with a dielectric material. In the illustrated case, with a filling member of PTFE, the hollow wave guide 80 has a diameter in the order of 5-6 mm.

Figure 5B:
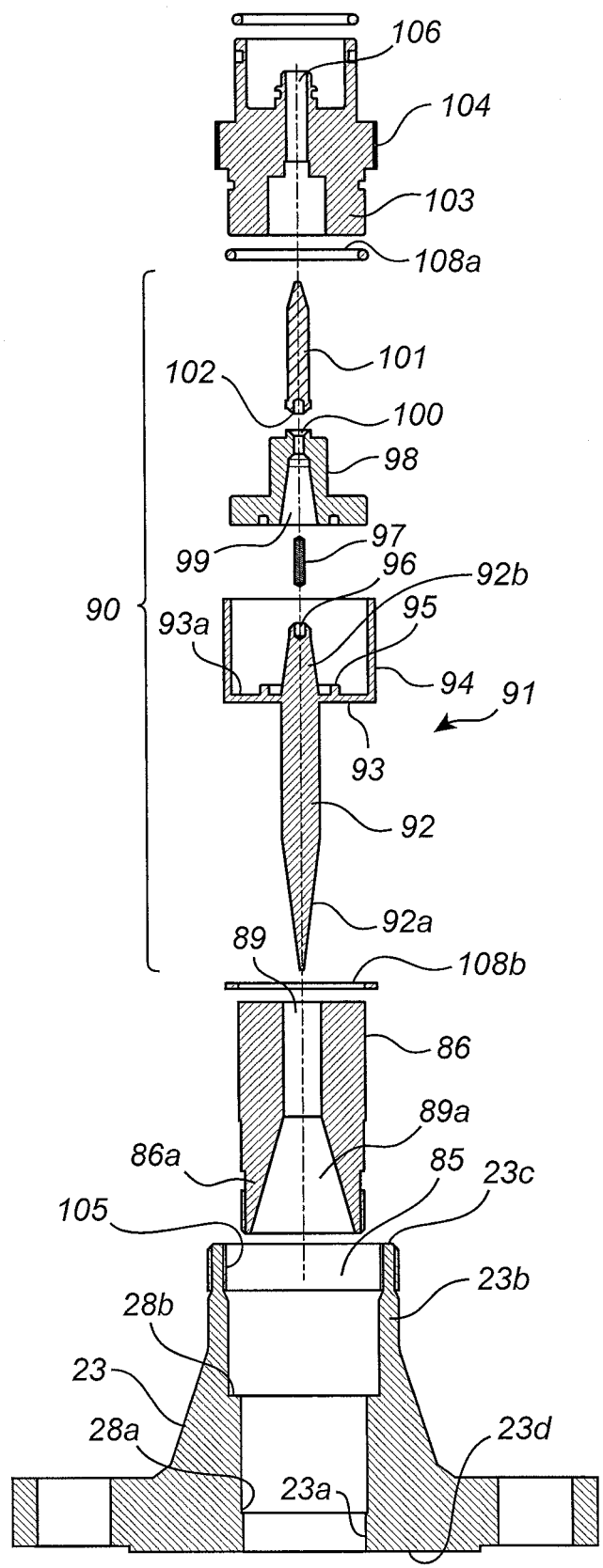

With reference primarily to FIG. 5*b*, the feed through structure 81 comprises a fixed tank connection 23, here identical to the tank connection 23 in FIGS. 2 and 3. In the opening 85 is fitted an essentially cylindrical tank connection adaptor 86. Just like in FIGS. 2 and 3, the adaptor 86 is suspended by the tank connection 23, but in this case only by the lower abutment 28*a*.

In the illustrated case, the adaptor 86 is suspended in a lower (interior facing) portion 23*a* of the fixed tank connection, so that an upper (exterior facing) portion 23*b* of the tank connection 23 extends above the adaptor 86. The adaptor 86 may alternatively be flush with the upper surface 23*c* of the tank connection structure, or even extend above the surface 23*c*. Further, in the illustrated example, the lower (interior facing) portion 86*a* of the adaptor 86 extends beyond the bottom surface 23*d* of the tank connection 23. A threading 87 is here formed on the peripheral surface of the lower portion 86a, and the antenna horn 82 has a corresponding threading 88 to enable easy mounting of the antenna horn 82 to the tank connection adaptor 81.

The adaptor 86 has a channel 89 which forms a lower portion of the wave guide 80. The bottom portion 89a of the channel is outwardly tapered, i.e. becomes wider closer to the interior of the tank, to provide matching with the antenna horn 82. In the channel 89 there is arranged a coupling arrangement 90, here comprising a dielectric wave guide filling element 91, typically made of a relatively soft dielectric material, such as PTFE. The member 91 has a first elongated center portion 92, a second disc-shaped portion 93 extending out from the center portion, and a third cylindrical portion 94 extending upwards from the periphery of the disc-shaped portion. The second and third portions thereby create the shape of a bucket. On the upper surface 93a of the disc-shaped portion 93 there is further formed an annular protrusion 95, intended to act as a quarter wave choke.

The center portion 92 has a tapered lower end 92a which extends into the tapered portion 89a of the channel 89. The upper end 92b of the center portion 92 is also slightly tapered, and has in its end an indentation 96 in which is fitted a pin 97 of a structurally strong dielectric material, such as resin, glass or aluminum oxide.

The pin 97 is held in place by an intermediate metal element 98, adapted to fit in the interior of the bucket, and having an inner space 99 formed to receive the upper end 92b of the center portion 92. The metal element 98 has an opening 100 through which the pin 97 extends. A second wave guide dielectric filling element 101 is arranged on the metal element 98, and has in its lower end an indentation 102 adapted to receive the pin.

The pin 97 held in place by the metal element 98 serves to prevent that a relatively soft dielectric wave guide filling element is forced out of the channel 89 by the pressure inside the tank, in particular during conditions of elevated temperatures. With this design, a feed through structure 81 designed for 26 GHz with a wave guide filling of PTFE can withstand pressures of up to 40 bar in temperatures of up to 200 degrees Celsius.

The tank feed through structure 81 further comprises a metal fastening member 103, arranged to be secured to the tank connection 23 such that the coupling arrangement 90 comprising the wave guide filling elements 91 and 101, as well as the pin 97 and metal element 98, is sandwiched between the tank connection 23 and the fastening member 103. In the illustrated case, the fastening member 103 has an outer threading 104, corresponding to a threading 105 on the inside of the upper portion 23b of the tank connection 23, so that the fastening member 103 can be securely threaded in place. The fastening member 103 further has a channel 106, adapted to surround the second wave guide filling element 101, to form the upper part of the wave guide 80.

The feed through structure may also include a process seal, i.e. a seal preventing tank atmosphere potentially including product in gas form from leaving the tank. This may, for example, be accomplished by a plurality of sealing elements included in the coupling arrangement. In this embodiment, sealing elements are not arranged around the filling member 91, as was the case in the embodiment in FIG. 4a-b. The reason is that the embodiment in FIG. 5a-b is intended for elevated temperatures. Under these conditions, potential variations in diameter of the PTFE filling member make sealing difficult. For this purpose, the filling member has the bucket shape described above, and a sealing element such as an o-ring 108a is provided between the inside of the cylindrical portion 94 and the fastening member 103. The material thickness of the portion 94 is much smaller, thus leading to smaller potential heat expansion. A further sealing element, here a flat ring 108b is provided between the upper annular abutment 28b of tank connection 23 and the peripheral part of the disc shaped portion 93.

It is noted that the tank connections 23 in all above embodiments are identical (or at least very similar). This clearly illustrates an advantage of the present invention, where identical tank connections may be provided with different coupling arrangements and connected to different types of signal propagation devices (i.e. probe, antenna horn, etc). Three examples of different tank connections 23', 23", 23''' are illustrated in FIG. 6.

The person skilled in the art realizes that the present invention by no means is limited to the preferred embodiments described above. On the contrary, many modifications and variations are possible within the scope of the appended claims. For example, the signal propagating device may be of another type, with suitable adaptations of the adaptor of the feed through structure.

What is claimed is:

1. A radar level gauge using electromagnetic waves for determining a filling level of a product in a tank, said radar level gauge comprising:
a transceiver for transmitting an electromagnetic transmit signal and receiving an electromagnetic echo signal,
processing circuitry connected to said transceiver for determining said filling level based on said electromagnetic echo signal,
a signal propagating device for directing said electromagnetic transmit signal towards a surface of said product and to return a reflection from said surface as said electromagnetic echo signal; and
a tank feed through structure including:
a fixed tank connection arranged to be secured to the tank, said fixed tank connection having a through hole with an abutment surface,
an electrically conducting tank connection adaptor arranged in said through hole in abutment with said abutment surface,
a coupling arrangement arranged in said through hole and resting against said tank connection adaptor, said coupling arrangement providing electromagnetic coupling between said transceiver and said signal propagating device through the feed through structure, and
a fastening member attached to said fixed tank connection thereby securing said coupling arrangement between said tank connection adaptor and said fastening member and securing said tank connection adapter between said coupling arrangement and said fixed tank connection.

2. The radar level gauge according to claim 1, wherein said feed through structure is configured such that, when said radar level gauge is mounted to a roof of said tank, said abutment surface faces out of said tank and said fastening member is attached to an upper portion of said fixed tank connection.

3. The radar level gauge according to claim 1, wherein said fixed tank connection and said tank connection adaptor are made of the same material, so that the fixed tank connection and the tank connection adaptor form an integrated tank connection.

4. The radar level gauge according to claim 1, wherein said tank connection adaptor in its entirety is made of an electrically conducting material.

5. The radar level gauge according to claim 4, wherein said coupling arrangement comprises an electrically conducting signal transmission member extending through a dielectric sleeve.

6. The radar level gauge according to claim 5, wherein said signal propagating device comprises a transmission line probe connected to said signal transmission member.

7. The radar level gauge according to claim 6, wherein said propagating device comprises a hollow wave guiding structure mounted to said adaptor part and surrounding said transmission line probe thereby forming a coaxial probe.

8. The radar level gauge according to claim 4, wherein said tank connection adaptor forms part of a hollow wave guide connecting the transceiver and the signal propagation device.

9. The radar level gauge according to claim 8, wherein said fixed tank connection forms part of said hollow wave guide.

10. The radar level gauge according to claim 8, wherein said coupling arrangement comprises a dielectric filling member arranged in said hollow wave guide.

11. The radar level gauge according to claim 8, wherein said propagating device comprises a directional antenna mounted to said tank connection adaptor.

12. The radar level gauge according to claim 1, wherein said coupling arrangement further includes at least one sealing member, so as to form a process seal of said tank.

* * * * *